June 27, 1961 J. CROY 2,989,839
COMBINED PNEUMATIC AND GRAVITY MOTOR
Filed Oct. 25, 1960 4 Sheets-Sheet 1
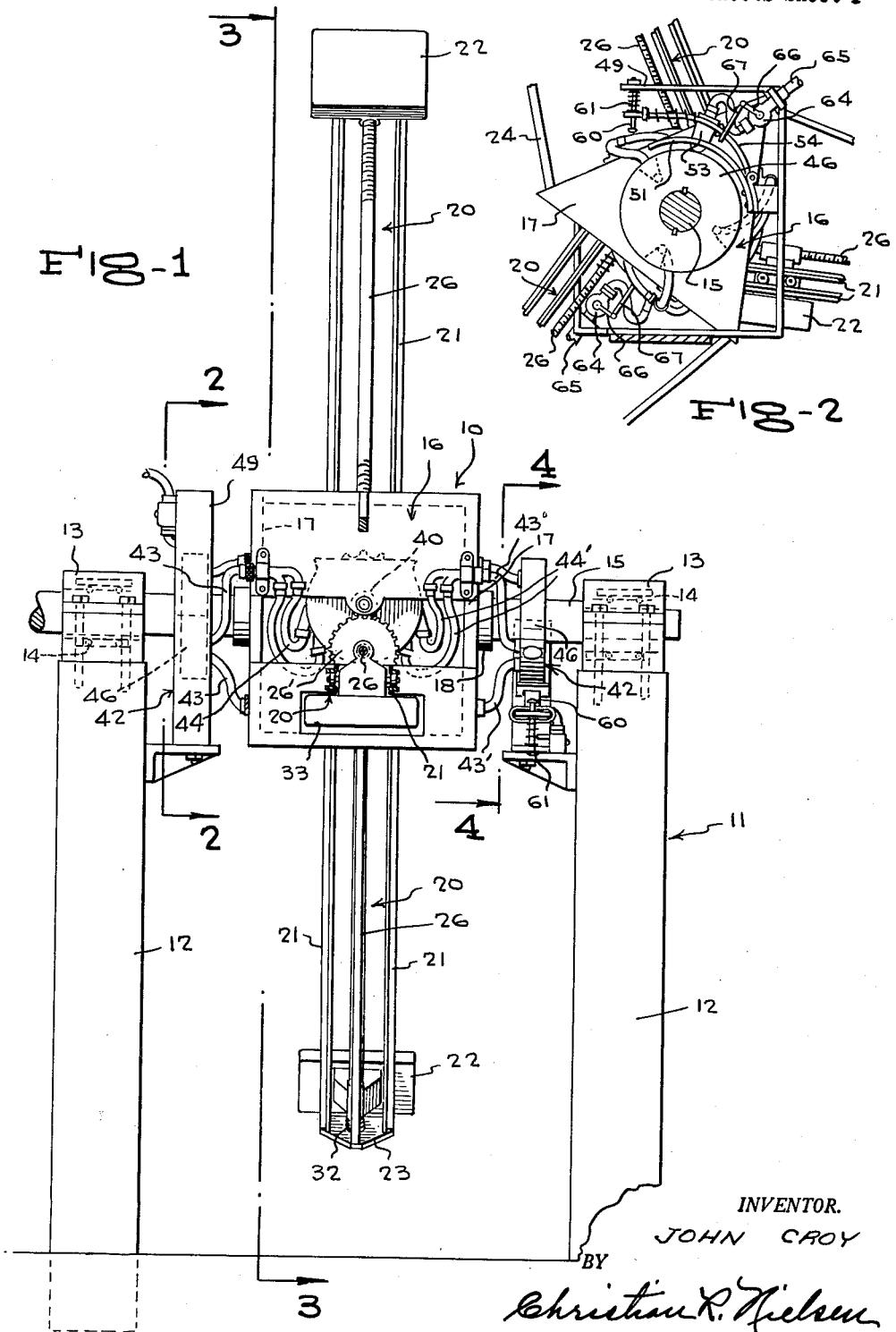
INVENTOR.
JOHN CROY
BY
Christian R. Nielsen
ATTORNEY

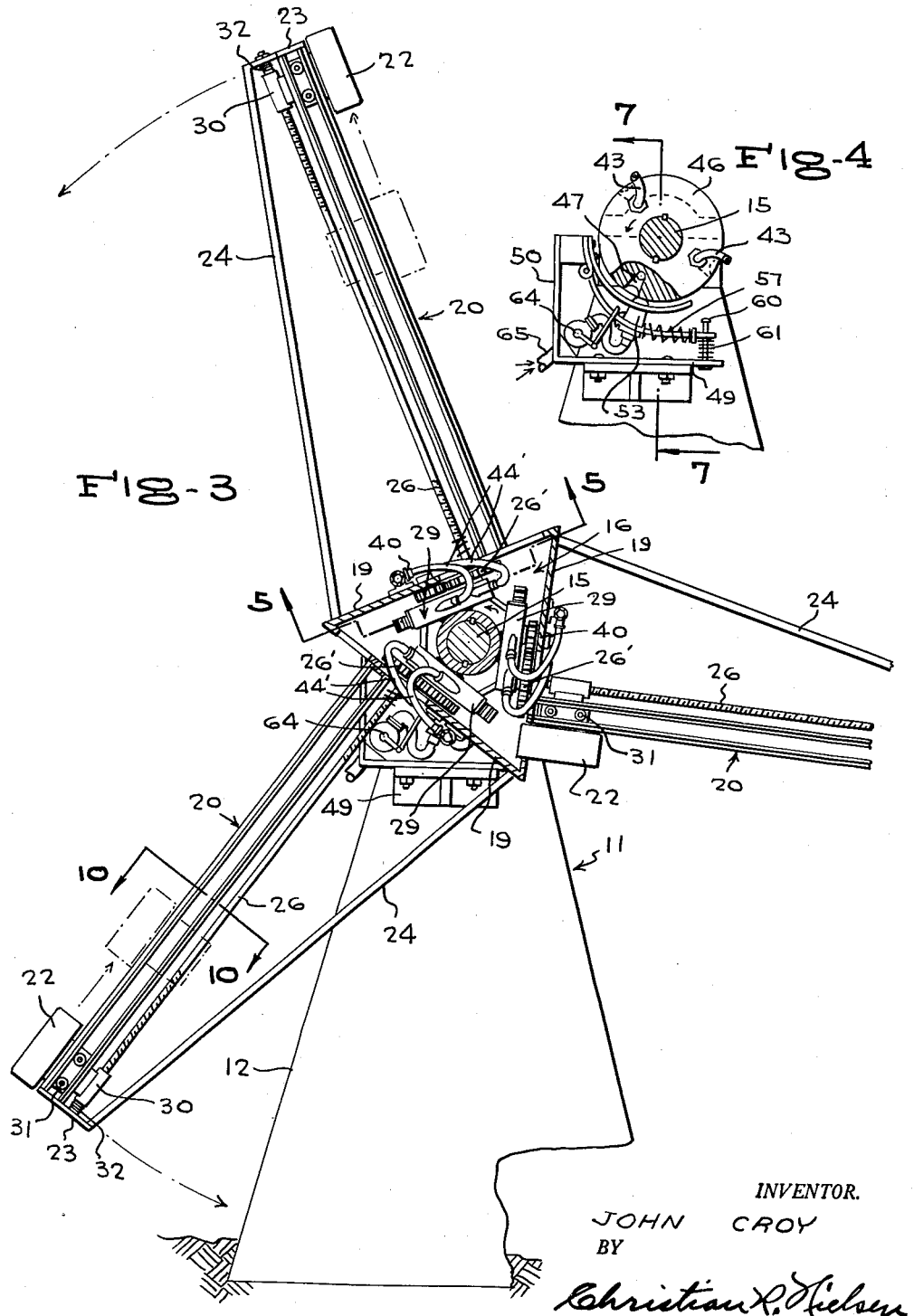

June 27, 1961            J. CROY            2,989,839
COMBINED PNEUMATIC AND GRAVITY MOTOR
Filed Oct. 25, 1960            4 Sheets-Sheet 3
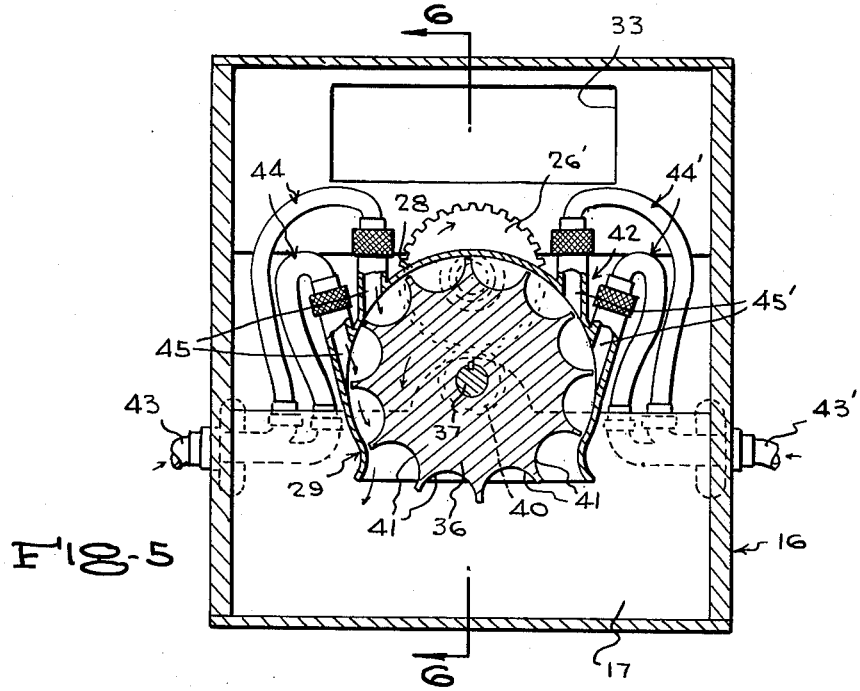
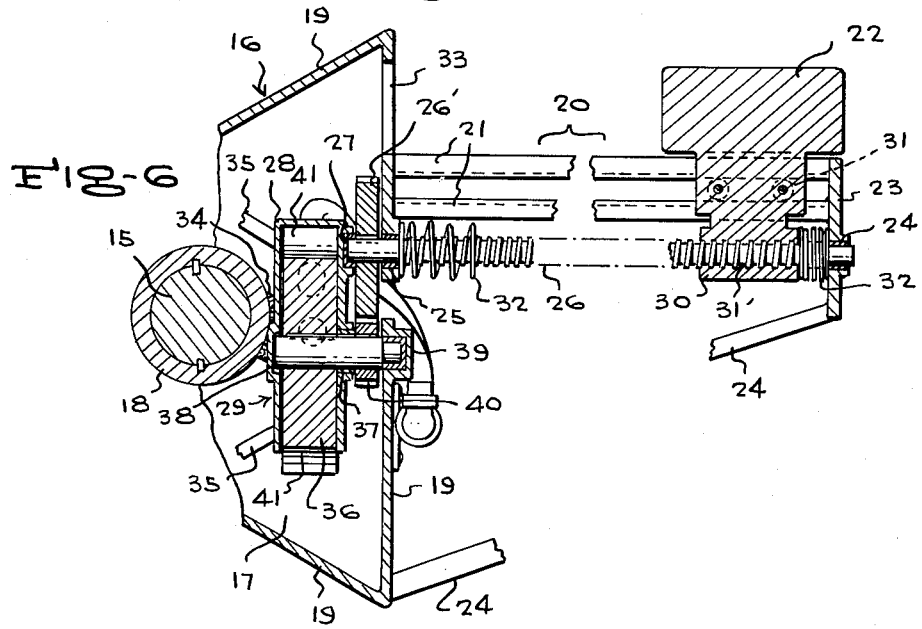
INVENTOR.
JOHN CROY
BY
Christian R. Nielsen
ATTORNEY June 27, 1961 J. CROY 2,989,839
COMBINED PNEUMATIC AND GRAVITY MOTOR
Filed Oct. 25, 1960 4 Sheets-Sheet 4
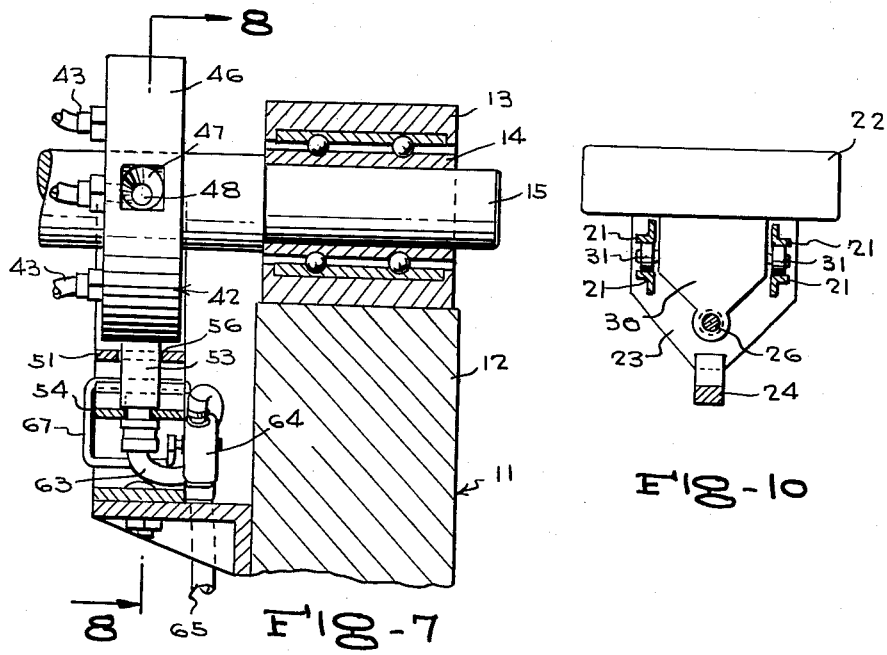
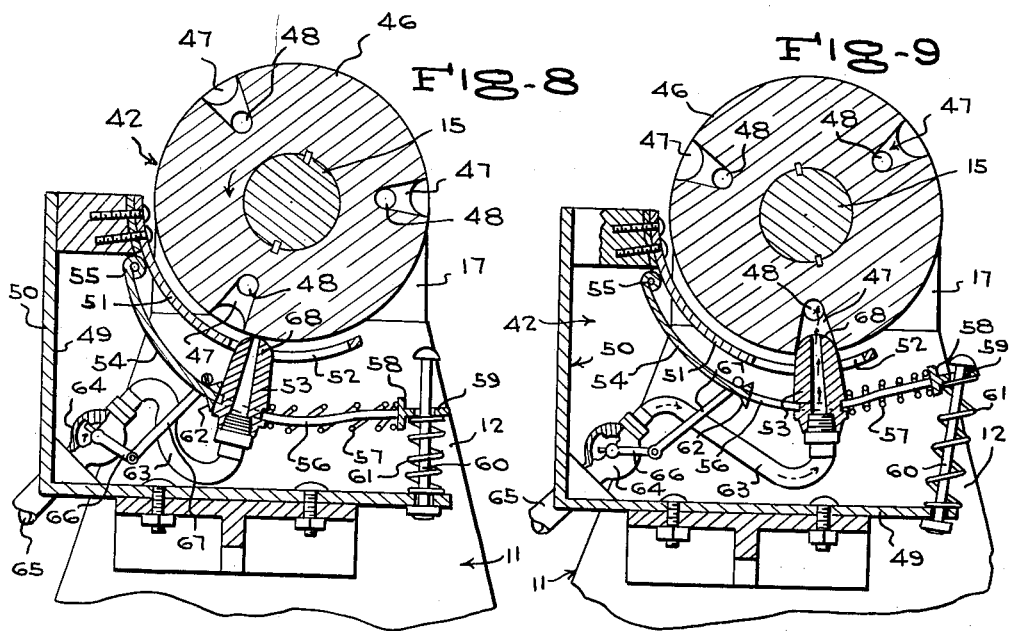
INVENTOR.
JOHN CROY
BY
Christian R. Nielsen
ATTORNEY

# United States Patent Office 2,989,839
Patented June 27, 1961

2,989,839
COMBINED PNEUMATIC AND GRAVITY MOTOR
John Croy, 2910 13th Road S., Arlington, Va.
Filed Oct. 25, 1960, Ser. No. 64,792
4 Claims. (Cl. 60—10)

This invention relates to a combined pneumatic and gravity motor and it consists in the constructions, arrangements and combinations herein described and claimed.

It is the cardinal object of the invention to provide a combined pneumatic and gravity motor wherein an upright support structure rotatably mounts a frame which comprises any desired number of radiating arms, each arm being provided with a weight member which is shiftable alternately away and toward the axis of rotation of the frame, which movement of the weights will decrease the load thrust when moved into position adjacent the axis of rotation of the frame and increase the load thrust at the axis of rotation on the downward movement of the radiating arms, the initial starting rotation of the frame being obtained from a suitable source of air pressure; and the movement of the weights being effected by individual air-actuated turbines.

More specifically, it is an object of the invention to provide a combined pneumatic and weight motor wherein the weights carried by the radiating arms are positively moved to their outer and inner positions by means of individual air turbines, each of which is controlled through timed valve mechanism.

Additional objects, advantages and features of invention will be apparent from the following description, considered in conjunction with the accompanying drawings, wherein, FIGURE 1 is an end elevation of the motor constructed in accordance with the invention.

FIGURE 2 is a cross section taken on the line 2—2 of FIGURE 1.

FIGURE 3 is a vertical section taken on the line 3—3 of FIGURE 1.

FIGURE 4 is a vertical section taken on the line 4—4 of FIGURE 1.

FIGURE 5 is a cross section taken on the line 5—5 of FIGURE 3.

FIGURE 6 is a vertical section taken on the line 6—6 of FIGURE 5.

FIGURE 7 is a vertical section taken on the line 7—7 of FIGURE 4, illustrating the relative positions of air control valve means and the air supply source.

FIGURE 8 is a vertical section taken on the line 8—8 of FIGURE 7, the parts being in such position to close the air inlet port of the valve.

FIGURE 9 is a similar section illustrating the air inlet valve open and other parts in such position to admit air into the control valve, and FIGURE 10 is a cross section taken on the line 10—10 of FIGURE 3.

Referring more particularly to the drawings, there is illustrated a combined pneumatic and gravity motor generally indicated by the reference character 10, and as best seen in FIGURES 1 and 3 comprises an upright frame 11, consisting in the present instance, of a pair of substantial, spaced pedestals 12 which may be braced by suitable struts (not shown) to provide the required rigidity and in addition, the pedestals 12 are preferably mounted in a base of concrete.

With particular reference to FIGURE 1, it will be seen that upon the upper ends of the pedestals 12, a respective bearing 13 is mounted including a ball race 14 for rotatably supporting a heavy shaft 15.

In the present illustration of the motor, three arms and weight units are illustrated, but obviously, this is optional, since the number may be increased to meet various power requirements of a given situation, and since the weight units are identical, a description of one unit will be ample for an understanding of the construction and operation of the units; and referring particularly to FIGURES 1, 2 and 3, there is illustrated a triangularly shaped housing 16, between the end walls 17 of which there is secured a bearing member 18 which is keyed to the shaft 15. Thus the housing will rotate with the shaft.

Attention is now invited to FIGURES 3 and 6, wherein it will be seen that the walls 19, which together with the end walls 17 define the housing 16 and that each wall 19 has suitably secured thereto a radially extended race-way 20, which is offset with respect to the shaft 15, and as clearly shown in FIGURE 6, comprises two pairs of parallel spaced bars 21 forming the means for guidance of the weight means 22, as will be presently explained.

The bars 21 are connected at their outer ends by means of a plate 23 and connected between said plate and the wall 19 there is a brace rod 24 affording further rigidity to the race-way 20. The plate 23 which is in opposed relation to the wall 19 upon which the race-way is mounted has a bearing 24 and the wall 19 is also provided with a bearing 25, these bearings being in alignment and positioned directly beneath the bars 21 of the race-way. A worm shaft 26 is rotatably journalled in these bearings; the shaft 26 being of a length to project through the bearing 25 for mounting of a gear 26' within the housing 16, the inner end of the worm shaft being journalled in a bearing 27 formed in the housing 28 of an air turbine 29, the function of which will be presently described.

The several weights 22 are of identical construction and as clearly shown in FIGURES 6 and 10, the weight 22 has a depending body 30 of a width to be slidable between the pairs of rails 21 and is slidably supported therebetween by means of roller bearings 31. The depending body portion is formed with a threaded bore 31' through which the worm shaft 26 is threaded. In order to eliminate shock between the weight and supporting structure, cushion springs 32 are positioned upon the worm shaft so as to be contacted by the weight when moved in either direction.

The walls 19 which mount the race-way 20 are formed with an opening 33, in line with the movement of the respective weights 22 so that the weights may partially enter the housing 16, which openings also serve as an outlet for exhaust of air from the turbines 29, as will be described.

The housing 28 of the air turbines 29 are secured to the bearing 18, as by welding as indicated at 34 and are additionally supported by brace rods 35 secured between the housings 28 and walls 19 of the housing 16. A rotor 36 is rotatably mounted within the housings 28 and is keyed to a shaft 37, the latter being journalled in bearings 38 and 39. The shaft 37 has keyed thereto a small gear 40 which is in mesh with the gear 26' on the worm shaft 26 to effect rotation thereof under operation of the turbines. The rotor 36 of the turbines is illustrated as having radially disposed pockets 41.

In order that the weights 22 may be caused to move from a point adjacent the axis of rotation of the frame to a point outwardly from such axis, it is necessary to reverse the rotation of the rotor of the air turbines 29 at the extreme movement of the weights, and to this end, timing mechanism generally indicated at 42 is employed, reference now being made to FIGURES 5, 7, 8 and 9 of the drawings.

From a consideration of FIGURE 5 of the drawings, it will be seen that the housing 28 of the turbine 29 is provided with a pair of air inlets 43 and 43' each of which is connected with respective timing mechanisms shown in detail in FIGURES 7, 8 and 9. A pair of air jet nozzles 44 are connected to the inlet 43, while a pair of nozzles 44' are connected to the inlet 43', these nozzles opening upon ports 45 formed in the periphery of the housing 28 of the turbine and arranged to discharge air at a tangent to the pockets 41 of the rotor 36, which discharge of air is alternately discharged to actuate the rotor in reverse directions of rotation by the timing mechanism 42 now to be described. It should be understood that a pair of timing members are operatively connected with each turbine, to effect clockwise and counter clockwise rotation of the worm shaft 26, and that each timer is of identical construction.

Attention is now directed to FIGURE 1 for an understanding of the timing mechanism wherein a pair of annular air distributor drums 46 are shown as keyed to the shaft 15 for rotation therewith. The drums 46 will be provided with three peripherally located, conically shaped inlet ports 47 for receiving a supply of compressed air to each turbine, each port having an air discharge opening 48 in communication with the inlets 43 and 43'.

Each timing mechanism 42 comprises an L-shaped bracket 49 which is suitably supported upon the inner side of the pedestals 12 and is positioned beneath the drum 46 and presents an upright arm 50 upon which there is mounted a semi-circular plate 51 which extends concentrically about the lower portion of the drum. The plate 51 is formed with a slot 52 for guidance of an air nozzle 53 as will be presently explained. A swinging arm 54 is hingedly mounted as at 55, the arm being slotted as at 56 for slidably supporting the nozzle 53 against the tension of a helical spring 57 interposed between the nozzle and an abutment 58 of the arm 54. The outer end of the arm 54 is formed with an opening 59 for reception of a guide pin 60 which is loosely mounted in the horizontal plate of the bracket 49 and the swinging arm 54; this spring functioning to maintain the nozzle 53 in contacting engagement with the periphery of the drum. The swinging arm 54 is also provided with an enlargement 62 at the termination of the slot 56 of the arm.

The nozzle 53 includes a flexible hose 63, one end of which is connected to an air valve 64, which is connected to an air line 65 from a suitable source of compressed air. The valve 64 is actuated to open and closed positions by means of a link 66 and link 67, the latter being connected to the swinging arm 54 at the abutment 62.

The discharge end 68 of the nozzle is rounded and conforms to the shape of the inlet ports 47 so as to snugly seat therein under pressure exerted by the spring 61 under rotation of the drum 46.

The operation of the motor is substantially as follows, reference being made to FIGURE 3 of the drawings, wherein the uppermost radiating arm or race-way is positioned slightly off center with respect to the axis of rotation, the weight 22 having been moved to the outermost limit of movement upon the raceway 20 due to clockwise rotation of the worm shaft 26 by its associated turbine 29. At this position, the timer mechanism will be in the position shown in FIGURE 9, the valve 64 being in open position admitting compressed air through the nozzle 53, the port 48 of the turbine by means of hose 43. However, since the weight has moved to the extreme movement of the race-way 20, the nozzle 53 will be forced from port 47 under continued rotation of the drum 46, compressing spring 61, moving plate 54 downwardly and allowing spring 57 to expand to move the nozzle along the slot 56. This movement of the nozzle will close the valve 64 from the source of compressed air.

Simultaneously with the above operation, the timer 42 associated with air inlets 43' and 44' will have brought the nozzle 53 into registry with a port 47 under expanding action of spring 61 and spring action of the hinged plate 54. The upward movement of the nozzle and plate from the position shown in FIGURE 8, will open valve 64 by means of the linkage 66 and 67 admitting air to the turbine 29 of the unit, through ports 43' and 44' and as may be seen in FIGURE 5, a counter clockwise rotation will be exerted upon the rotor 46 and the worm shaft 26; and thus the weight will be returned to a position partially within the housing 16.

The same operation occurs in retracting the weight members of the several arms or raceways, the retraction occurring in an area of rotation of the raceways approximately at the lower vertical center of rotation of the frame and it will be seen that the separate and individual movement of the weights to outermost positions on the raceways imparts the initial downward thrust or torque to the shaft 15, which is greatly amplified in the further downward movement of the raceways. The rotation of the shaft 15 may be employed in actuating many appliances and at a very low cost.

While I have shown and described a preferred form of the motor, this is by way of illustration, and I consider as my own all such modifications in construction as fairly fall within the scope of the appended claims.

I claim:

1. A combined pneumatic and gravity motor comprising an upright rigid frame structure and including spaced pedestals, a bearing upon the upper ends of said pedestals, a shaft journalled in said bearings, a housing fixed to said shaft for rotation therewith, an elongated, radially extended raceway secured to the side walls of said housing, each raceway being offset with respect to said shaft, a weight member slidably supported on each raceway, a worm shaft carried by each raceway being threadedly engaged with each respective weight member, a pneumatic drive means connected with each worm shaft to effect movement of said weight means away and toward the axis of rotation of said first named shaft, a source of compressed air operatively connected to said pneumatic drive means and means connected with said pneumatic drive means for reversing the direction of rotation of said worm shaft when said weight members reach the limits of movement upon said raceways.

2. A combined pneumatic and gravity motor comprising an upright rigid frame structure and including spaced pedestals, a bearing upon the upper ends of said pedestals, a shaft journalled in said bearings, a housing fixed to said shaft for rotation therewith, an elongated, radially extended raceway secured to the side walls of said housing, each raceway being offset with respect to said shaft, a weight member slidably supported on each raceway, a worm shaft carried by each raceway being threadedly engaged with each respective weight member, an air turbine for each raceway including a housing fixed to said first named shaft, said worm shaft being journalled in a forward portion of the raceway and a wall of said housing and having an end projecting into the housing, a large gear keyed to the projecting end of the worm shaft; an impeller within the housing of the turbine keyed to a shaft journalled in bearings of said housing and in a bearing carried by the wall of said first named housing, the shaft of the turbine having a small gear in mesh with the large gear on the worm shaft, said turbine housing having air inlet ports upon opposite sides thereof and in communication with said turbine, a source of compressed air connected with said air inlets and an air control means interposed between said source of compressed air and said air inlets for reversing the direction of rotation of said worm shafts when said weight members reach the limits of movements upon said raceway.

3. The structure of claim 2, in which said air control means comprises annular drums keyed to said first named shaft, each drum having equally spaced ports formed in the periphery of said drums corresponding to the number of raceways, an air discharge nozzle for each drum complemental to said spaced ports under rotation of said drums, each nozzle having an air supply conduit including a valve and spring tensioned means associated with said valve for opening and closing said valve, said valve being in open position when the nozzles are engaged in ports of said drums.

4. The structure of claim 2, in which said air control means comprises a pair of annular drums positioned upon opposite sides of said first named housing and keyed to said first named shaft, each drum having a number of ports formed in the periphery thereof and in communication with inlet ports of said turbines, a fixed semi-circular plate position beneath each drum, each plate being provided with a slot concentric with said drums and said ports, a swingable semi-circular plate beneath said first named plate and having a slot in alignment with the slot of said fixed plate, an air discharge nozzle slidably mounted in the slot of the swinging plate, the slot of the fixed plates engaging an upper portion of the discharge nozzles for guidance thereof under movement of the nozzles in the slots of the swinging plates, spring means associated with said swingable plates for urging said discharge nozzles into engagement with the periphery of said drums, spring means on said swingable plates exerting pressure upon said nozzles against the direction of rotation of said drums, air pressure supplies having hose connections with said discharge nozzles, a valve interposed between said air pressure supply lines and said hose and link means connected between said valves and said swingable plates for opening and closing said valves, said valves being in open position when the nozzles are engaged in ports of said drums.

References Cited in the file of this patent

UNITED STATES PATENTS

| | | |
|---|---|---|
| 833,031 | Errani et al. | Oct. 9, 1906 |
| 2,261,568 | Seawright | Nov. 4, 1941 |